(No Model.)
S. G. READ.
NUT LOCK.
No. 498,446.
Patented May 30, 1893.
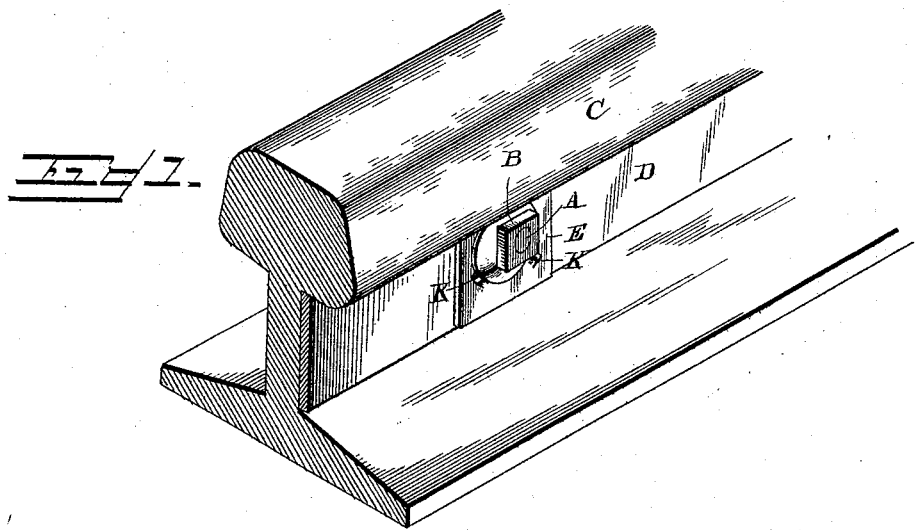
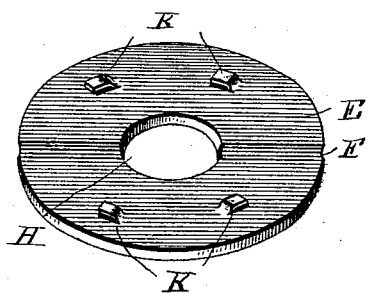
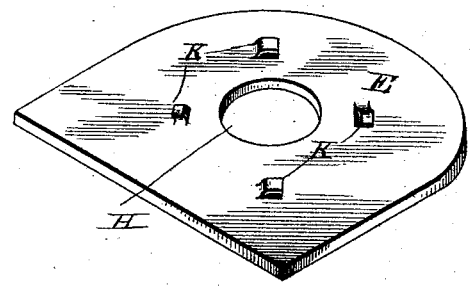
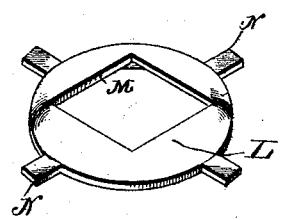
Witnesses
W. E. Schneider.
Inventor
S. G. Read.
By his Attorneys,
C. A. Snow & Co.

UNITED STATES PATENT OFFICE.

STEPHEN G. READ, OF CHOTEAU, MONTANA, ASSIGNOR OF ONE-HALF TO ERASTUS GREEN, OF SAME PLACE.

NUT-LOCK.

SPECIFICATION forming part of Letters Patent No. 498,446, dated May 30, 1893.

Application filed September 2, 1892. Serial No. 444,860. (No model.)

*To all whom it may concern:*

Be it known that I, STEPHEN G. READ, a citizen of the United States, residing at Choteau, in the county of Choteau and State of Montana, have invented a new and useful Nut-Lock, of which the following is a specification.

My invention relates to improvements in nut locks, the object in view being to provide a simple, cheap, and effective device which may be readily and quickly applied to the bolts and nuts employed in connection with railroad rails, machinery, &c., where the parts through which the bolts extend or with which they are connected are subjected to repeated or continuous jarring.

The construction, operation and advantages of my invention will appear in the following description, and the novel features involved will be particularly pointed out in the appended claim.

In the drawings:—Figure 1 is a perspective view of a bolt and nut provided with my improved locking device. Fig. 2 is a detail, in perspective, of the base or catch plate. Fig. 3 is a similar view of the locking plate. Fig. 4 is a view of a circular locking plate having retaining ribs.

A designates the bolt, and B the nut screwed thereon, C a portion of a rail, and D the fish plate.

E represents the base or catch plate, provided on its under or rear surface with a diametrical rib, F, which is adapted to engage a corresponding depression or groove in the fish-plate, or other surface upon which the base plate rests. The base or catch plate is further provided, around its central bolt opening, H, with a series of up-struck catches or ears, K K, raised slightly, at their free ends above the plane of the plate.

L represents a locking plate, having an angular central opening, M, to fit the nut, and provided at its periphery with a series of radial locks or fingers N, which are adapted to engage the catches or ears upon the base plate. This locking plate is convexed upon its outer side, and if formed of sheet metal, as shown in the drawings, is concavo-convex in shape, so that its central portion may engage the sides of the nut above that surface which bears against the fish-plate, or base-plate, to prevent slipping, or passing under the nut. The periphery of the locking plate lies upon the surface of the base-plate so as to engage the catches or ears. The struck up ears or tongues K form spring catches, which do not require to be bent down upon the projections or fingers to lock them; but the nut is turned back slightly to carry the projections in engagement with the spring catches. The projections are clamped by the resiliency of the catches at the inclined portion at the back; and as a nut cannot screw itself up the tendency of it in unscrewing will be to hold the projections more closely in the grasp of the resilient tongues or catches K.

In operation, the base-plate is arranged upon the bolt, and then the nut is screwed to place, after which the locking plate is adjusted, and the nut backed sufficiently to cause the locks or fingers to take under the free ends of the catches or ears. The base plate is held from rotation by the rib upon its under-surface, said rib being formed in any preferred manner, as by stamping, when the plate is made of sheet metal, or by any other approved method.

In Fig. 4 I have illustrated a locking-plate which is capable of general application, this form being that which is described as provided with the diametrical rib upon its under-surface to hold the plate from rotation. The form of locking plate which is shown in Figs. 1 and 2 are especially adapted to be applied to the joints between sections of rails, as shown, in which case the ribs are omitted and in place thereof the lower edges of the plates are made straight to engage the upper surface of the base of the rail as shown. Any other approved manner of securing this plate firmly in place, against rotation, may be employed.

Having thus described my invention, what I claim, and desire to secure by Letters Patent of the United States, is—

The combination of a bolt, a nut, a fixed washer provided with a series of integral struck up tongues each having a portion parallel with and arranged above the washer and provided with an inclined connecting portion at the back, whereby a spring clip is formed, and a concavo-convex locking plate having its periphery bearing on the washer and provided with radial projections arranged flat on the face of the washer, whereby they may be readily turned into and out of engagement with the clips, said locking plate having its raised central portion provided with an angular nut opening, substantially as described.

In testimony that I claim the foregoing as my own I have hereto affixed my signature in the presence of two witnesses.

STEPHEN G. READ.

Witnesses:
I. S. CORSON,
EUGENE PRIOR.